Figure 1:
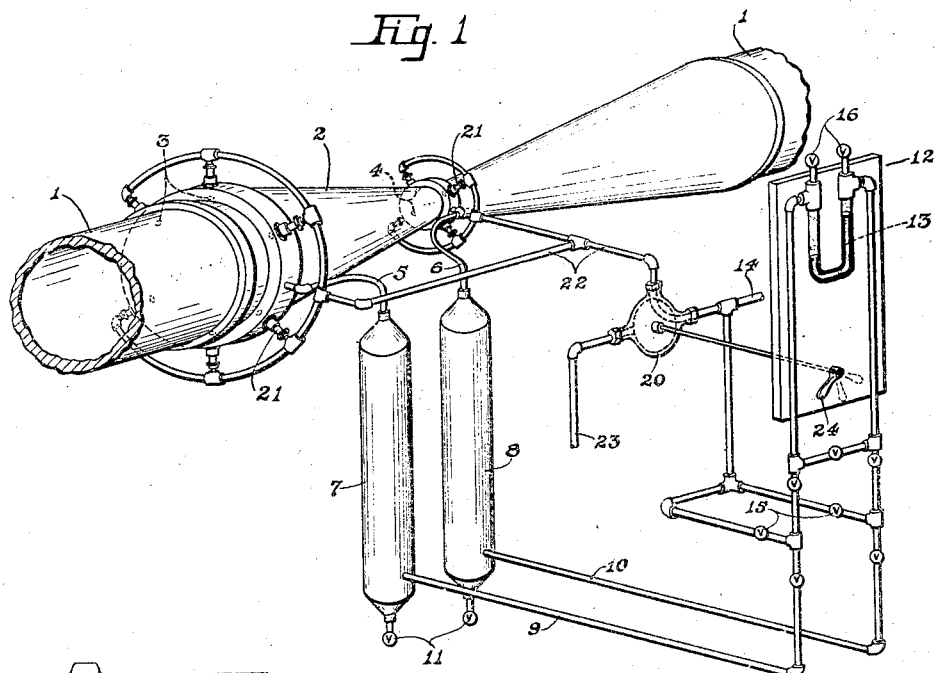

Oct. 27, 1936.    R. A. ALLTON    2,058,654
FLOW METER FOR SEWAGE
Filed June 22, 1935

Robert A. Allton
INVENTOR

BY Harry Dexter Peck
ATTORNEY

Patented Oct. 27, 1936

2,058,654

UNITED STATES PATENT OFFICE 2,058,654

FLOW METER FOR SEWAGE

Robert A. Allton, Columbus, Ohio, assignor to Builders Iron Foundry, Providence, R. I., a corporation of Rhode Island Application June 22, 1935, Serial No. 27,911

6 Claims. (Cl. 73—213)

My invention relates to an improved apparatus for metering sewage or other dirty fluids. It has to do particularly with the cleaning of piezometer vents, hereinafter vents, for the reliable obtaining of accurate pressures related to the rate of flow. A further object is to provide a master means whereby an operator may manipulate a single control and cause a number of vent cleaners in multiple to operate automatically and simultaneously.

It has long been found that flow meters for sewage, and other fluids containing sediment and material that deposit on the conduit walls, require provision and means for periodically cleaning out the vents. This must be done at frequent intervals. The fact that ten vents are generally required: six at the inlet section and four at the throat of a Venturi meter, for the accurate averaging of pressures, renders such frequent periodic cleaning an onerous task for the operator when the vents must be cleaned individually and at the conduit itself. Consequently this disagreeable task is likely to be neglected in the course of time with the usual personnel available for the operation of such plants.

My invention of a master control means, for multiple vent cleaners, that the operator can easily manipulate without inconvenience, makes the continuous metering of sewage and such fluids both practical and convenient for the first time.

A further object of my invention is to provide hydraulically operated piston-and-cylinder means for actuating the vent cleaners controlled by a three-way valve located adjacent to the flow rate indicator and distant from the Venturi tube.

A further specific object of my invention is to provide hydraulic means, operated by clean water, for pushing each vent cleaner through its vent to clean the vent and the provision of a mechanical means, such as a spring, for its return. It is to be noted that this is not a trivial detail since thereby the functioning of the vent cleaners occurs with minimum interference with the continuous functioning of the meter. An additional advantage obtained is that any leakage of the clean operating water past the piston acts to clean the inside of the cylinder. This particular construction accounts for much of the reliability of operation of this cleaner which is satisfactory over periods of time with minimum maintenance and upkeep.

These and such other objects of my invention as will appear in the drawing and described in the specification are intended to be claimed in the hereinafter appended claims.

Figure 2:
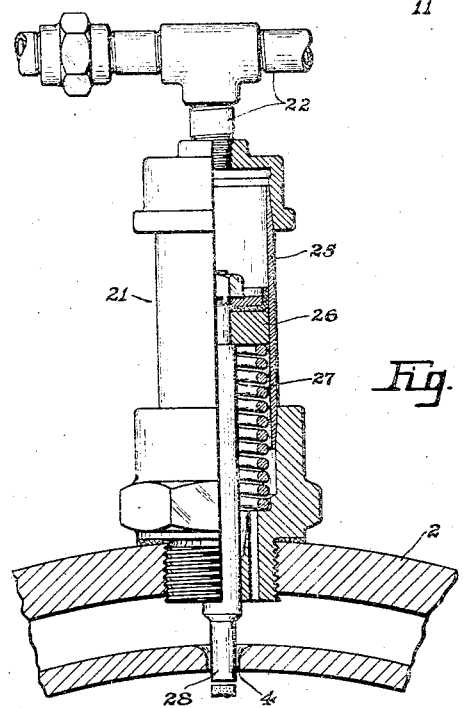

In the drawing, wherein like characters of reference indicate like parts throughout, Fig. 1 shows a diagrammatic perspective view of the general arrangement of my combination of a master control for operating a number of vent cleaners on a Venturi meter for sewage. Fig. 2 shows in elevation, and partially in section, the detail of the vent cleaner operable inwardly by its hydraulic piston-and-cylinder actuating means and with a spring for returning the piston to leave the vent in its operative condition.

In Fig. 1, conduit 1 contains Venturi tube 2 with six inlet vents 3 and four throat vents 4 at the inlet and throat sections respectively of the Venturi tube. Pressure pipes 5 and 6 respectively for the inlet and throat pressures are connected to sealing reservoirs 7 and 8 respectively. These reservoirs have pipes 9 and 10 connected thereto high enough above their bottoms to be at all times safely above any sludge settling therein. This sludge is periodically blown out of blow-off pipes 11 which are provided at the bottom of each reservoir 7 and 8. Connected to pressure pipes 9 and 10 is U-tube 12 containing mercury as the manometric liquid 13 for indicating the rate of flow. Pressure pipes 9 and 10 are in turn connectable with the pressure supply 14 by opening either valve 15. Air vents 16 are provided on top of the U-tube manometer 12. All of the above apparatus functions in the usual manner. However it is shown and described to make most clear the operation of my multiple vent cleaners, a description of which follows.

Located conveniently near the manometer 12 is three-way valve 20. This valve 20 is connected with pressure supply 14, drain 23 and also by pressure piping 22 with each of the ten vent cleaners 21. Valve 20 has a central plug of the customary design, shown dotted. Valve 20 is positionable by handle 24 operatively connected thereto. Handle 24 and valve 20 are shown in position for telemetrically operating the vent cleaners. Then valve 20 connects the pressure supply 14 with piping 22, which, in turn, is connected in multiple to each of the hydraulic cylinders 25 of the vent cleaners 21.

Referring also to Fig. 2, the valve position shown in Fig. 1 will be seen to cause water flow under pressure from line 14 through line 22 and into the outer end of each cylinder 25, thus forcing its piston 26 inwardly against spring 27 so that the vent cleaner stem 28 is forced inwardly through vent 4, in the case of the throat, (vent 3 in the case of the inlet).

When valve 20 is in its other extreme position, drain 23 is connected by pressure piping 22 with the cylinders 25 of the multiple vent cleaner actuators 21. Then, spring 27 and the water pressure inside of conduit 1 will force each piston 26 outwardly to withdraw stem 28 from its vent 4, thus completing the cleaning operation and leaving the vent opening clear so that the true pressure Venturi differential corresponding with the rate of flow therethrough is transmitted to U-tube manometer 12.

Ordinarily, cleaning at regular intervals of reasonable length keeps the vents satisfactorily open at all times. However, should the vents become plugged at any time, this will be immediately apparent (through the sluggish motion of mercury 13 in manometer 12) to the operator who then operates valve 20 by its handle 24 to cause the actuation of the vent cleaners to clean out the vents. Thus an improvement in meter operation results from having handle 24 where the operator can reach it easily while watching the action of U-tube manometer 12.

When not causing the actuation of the vent cleaners, handle 24 is set in a neutral position so that line 22 is completely blocked off both from the supply line 14 and drain 23. Also, in the normal operation of the vent cleaners 21, clean water under pressure will leak from the outer end of cylinders 25 inwardly past pistons 26 to keep the actuating means for cleaners 21 clean so that they will operate readily at all times.

While I have shown hydraulic actuating means as governed by a single master control for the operation of multiple vent cleaners, still I believe that I am the first to operate a number of vent cleaners from a single master control and so am entitled to claim protection broadly. For example, the apparatus of my invention could be actuated by pneumatic or other means equivalent to the described combination of hydraulic and mechanical means and still fall within the hereinafter appended claims. Similarly while my preferred embodiment, a Venturi tube, has been shown and specifically claimed, still the use of any other differential producer, an orifice for example, would fall within the scope of my claims.

I claim:

1. A pressure-responsive flow meter for measuring dirty fluids and having a plurality of piezometer vents in combination with a plurality of cleaner stem means for said vents, actuating means therefor and a single means for controlling the actuation of said vent cleaner stem means.

2. A pressure-responsive flow meter for measuring dirty fluids and having a plurality of piezometer vents in combination with a plurality of cleaner stem means for said vents and means for simultaneously actuating said vent cleaner stem means.

3. A pressure-responsive flow meter for measuring dirty fluids and having a plurality of piezometer vents in combination with a plurality of reciprocable cleaner stem means for said vents, manually controllable means for simultaneously actuating said cleaner stem means in one direction and means for automatically and simultaneously actuating said cleaner stem means in the opposite direction subsequent to the cessation of said manual control.

4. A pressure-responsive flow meter for measuring dirty fluids and having a plurality of piezometer vents in combination with a plurality of cleaner stem means for said vents normally withdrawn therefrom and means for simultaneously operating said cleaner stem means.

5. A flow meter for dirty fluids comprising a Venturi tube having a plurality of vents; pressure differential responsive flow rate indicating means located at a distance therefrom and operatively connected therewith so that the character of response of said flow rate indicating means indicates the condition of said vents; cleaners for said vents and means adjacent said flow rate indicating means having an element for telemetrically operating said vent cleaners.

6. A pressure-responsive flow meter for dirty fluids having spaced piezometer vents and adapted to produce a differential pressure between said vents corresponding with the flow rate of said fluid, the combination of a cleaner stem means for each of said vents, means for actuating each of said cleaner stem means respectively toward and away from its said vent, governing means for said actuating means, means operatively connecting said actuating means together and with said governing means, said actuating and connecting means being so adapted and arranged as to normally maintain said cleaners withdrawn from said vents and to cause the simultaneous operation of all of said cleaner stem means upon the functioning of said governing means.

ROBERT A. ALLTON.